United States Patent
Furukawa et al.

[11] Patent Number: 5,854,949
[45] Date of Patent: Dec. 29, 1998

[54] FLASHER CAPABLE OF VARYING A LIGHT DISTRIBUTION ANGLE

[75] Inventors: Akio Furukawa; Toshiaki Nakahira, both of Yokohama, Japan

[73] Assignee: Ricoh Company, Ltd., Tokyo, Japan

[21] Appl. No.: 732,710

[22] Filed: Oct. 18, 1996

[30] Foreign Application Priority Data

Oct. 20, 1995 [JP] Japan .................................. 7-297623

[51] Int. Cl.⁶ .............................................. G03B 15/06
[52] U.S. Cl. .............................................. 396/200
[58] Field of Search ........................... 396/795, 62, 175, 396/200; 362/16–18

[56] References Cited

U.S. PATENT DOCUMENTS

| | | | |
|---|---|---|---|
| 4,821,053 | 4/1989 | Dowe et al. | 354/149.1 |
| 5,652,920 | 7/1997 | Kaihara et al. | 396/62 |

FOREIGN PATENT DOCUMENTS

| | | | |
|---|---|---|---|
| 2740558 | 3/1979 | Germany | 396/795 |
| 3-188431 A | 8/1991 | Japan | 396/795 |

*Primary Examiner*—Eddie C. Lee
*Assistant Examiner*—Christopher E. Mahoney
*Attorney, Agent, or Firm*—McDermott, Will & Emery

[57] ABSTRACT

A stationary reflecting mirror (reflecting umbrella 2) is provided for reflecting light, emitted from a xenon discharge tube (3), to the side of an object to be photographed. An upper reflector plate (5) is provided above and in front of the stationary reflecting umbrella (2) and a lower reflector plate (6) is provided below and in front of the stationary reflecting umbrella (2). The upper and lower deflector plates (5, 6) are constructed so as to be pivoted in interlock with a change in the focal length of a photographic lens. With the upper and lower deflector plates (5, 6), part of light emitted from an opening (2A) is reflected and the direction of the reflected light that is emitted to the object is varied, and thereby the distribution angle of the light emitted to the object is varied. In this way, there is obtainable a flasher which is structurally simple and inexpensive without using high-performance lenses or an accurate moving mechanism.

14 Claims, 5 Drawing Sheets

FLASHER CAPABLE OF VARYING A LIGHT DISTRIBUTION ANGLE

BACKGROUND OF THE INVENTION

1. Field of the Invention

The present invention relates to a variable distribution angle flasher which c in vary a light distribution angle, and more particularly to a variable light distribution angle flasher that is used in a camera equipped with varifocal photographic lenses.

2. Description of the Prior Art

Hitherto, there is known a camera equipped with varifocal lenses (variable-focal-length lenses). In this type of camera, there are various kinds of cameras, such as a camera where focal length is changed between macro photography, standard photography, and telephotography, a camera where focal length is changed between wide-angle photography standard photography, and telephotography, a camera where focal length is changed between standard photography and telephotography, a camera where focal length is changed between a wide-angle photography and standard photography, a camera equipped with a zoom lens, and a camera to which an interchangeable lens is attached.

In the camera equipped with varifocal lenses, the field angle of coverage varies if the focal length of the photographic lens is varied. In the case where flash photographing is performed with th is kind of camera, it is preferable, from the standpoint that the flashed light is effectively utilized, that a variable light distribution angle flasher be employed. In the variable light distribution angle flasher, the spread angle (angle of distribution or angle of irradiation) of the flashed light is varied continuously or by steps in accordance with the focal length (or field angle of coverage) of the photographic lens.

In the variable light distribution angle flasher of the above kind, a collective lens (e.g. a Fresnel lens) with positive power is provided, for example, at the front of the main body of the camera. A light emitting unit, which consists of a flash tube and a reflecting mirror (reflecting umbrella), is provided behind the collective lens. In a flasher such as this, the axial distance between the light emitting unit and the collective lens is varied in interlock with a change in the field angle of coverage. More specifically, in the flasher, the axial distance is made shorter when the wide-angle lens is used and longer when the telephoto lens is used, thereby varying the distribution angle of the flashed light.

The angle of irradiation of the light emitting unit of the variable light distribution angle flasher is constant. Therefore, when the axial distance between the light emitting unit and the collective lens is short, much of the flashed light is incident on the collective lens and is irradiated toward an object to be photographed. However, when the axial distance is long, the angle expected by the collective lens is small, so the flashed light outside the range of the small angle cannot be taken into the collective lens. Consequently, there is a problem in that the flashed light is not effectively utilized.

Then, there has been proposed a variable light distribution angle flasher where a flash tube and a reflecting mirror are formed integrally, a lens with positive power is fixed in front of the reflecting mirror to constitute a light emitting unit, and a lens with negative power is disposed in front of the light emitting unit (see Japan Laid-Open Publication No. HEI 6-123911). In this device, the axial distance between the light emitting unit and the negative lens is varied in interlock with a change in the field angle of coverage (a change in the focal length of the camera). With this, the distribution angle of the flashed light is changed.

In the variable light distribution angle flasher, optical characteristics, such as refractive index of each of the positive lens of the light emitting unit and the negative lens fixed to the main body of the camera and radius of curvature of each lens surface, must be determined accurately in order to obtain a desired change in the light distribution angle. In addition, the axial distance between the light emitting unit and the negative lens has to be varied with a high degree of accuracy. This variable light distribution angle flasher, therefore, becomes expensive.

If the positive and negative lenses are manufactured with optical glass, the characteristics will become excellent. However, the cost is further increased. Positive and negative lenses using plastic Fresnel lenses can reduce the cost. However, an accurate light distribution characteristic is difficult to obtain, because the Fresnel lens has interference fringes.

SUMMARY OF THE INVENTION

The present invention has been made in view of the aforementioned problems.

Accordingly, it is the primary objective of the present invention to provide a variable light distribution angle flasher which is structurally simple and inexpensive without using high-performance lenses and an accurate moving mechanism. More specifically, the objective of the present invention is to provide a variable light distribution angle flasher which is used in a camera equipped with varifocal photographic lenses and which is capable of changing a light distribution angle in interlock with a change in the focal length of the photographic lens (a change in the field angle of coverage).

To solve the aforementioned problems, the present invention is constituted by a variable light distribution angle flasher, which is provided with a reflecting mirror for receiving light emitted from a flash source and then irradiating reflected light toward an object to be photographed and which can vary a distribution angle of the light that is irradiated toward the object. In the flasher, the reflecting mirror is constructed so as to be movable in order to vary the distribution angle of the irradiated light. Because the reflecting mirror is mechanically moved to change the light distribution angle, the light distribution angle can be effectively varied with simple and inexpensive structure.

It is preferable that the reflecting mirror be constituted by a stationary reflecting mirror where a distribution angle of the light reflected toward the object is constant, a movable reflecting mirror where a distribution angle of the light reflected toward the object is variable, and a drive mechanism for driving the movable reflecting mirror.

It is also preferable that the variable light distribution angle flasher be used in a camera with a varifocal photographic lens or a camera with a variable field angle of coverage. In this case, the aforementioned movable reflecting mirror is driven in interlock with a change in the focal length (or a change in the field angle of coverage) of the varifocal photographic lens.

In the aforementioned variable light distribution angle flasher, the flash source is a nearly cylindrical flash discharge tube. The stationary reflecting mirror is constructed so that it receives the emitted light from the flash discharge tube and irradiates reflected light from an opening formed forwards toward the object to be photographed. The movable reflecting mirror is constituted by an upper reflector plate and a lower reflector plate. The upper reflector plate is disposed above and in front of the opening, and the lower reflector plate is disposed below and in front of the opening. The upper and lower reflector plates receive part of the light emitted from the opening and is tilted up and down in interlock with a change in the focal length of the varifocal photographic lens so that a distribution angle of the reflected light emitted to the object is varied. Portions of the upper reflector plate and the lower reflector plate which are far away from the opening are supported. When the focal length is on a wide-angle side, portions of the upper and lower reflector plates which are near the opening are driven so as to be moved away from each other. When, on the other hand, the focal length is on a telephoto side, the portions of the upper and lower reflector plates which are near the opening are driven so as to be moved toward each other.

The movable reflecting mirror is driven continuously or by steps in interlock with a change in the focal length. The reflecting surface of each of the upper reflector plate, the lower reflector plate, and the stationary reflecting mirror presents a parabolic shape. When the focal length is on the telephoto side, the reflecting surface of the upper reflector plate and the reflecting surface of the lower reflector plate are disposed so that the reflecting surfaces are substantially continuous to parabolic reflecting surfaces extended from a parabolic reflecting surface of the stationary reflecting mirror toward the opening.

Also, it is preferable that the shaft support members, which are supported in parallel with respective long edge portions of the upper and lower reflector plates, are formed integrally with bent portions formed in respective end portions of the upper and lower reflector plates.

In addition, in order to achieve the aforementioned objective, the present invention is constituted by a variable light distribution angle flasher which is used in a camera with a varifocal photographic lens and can vary a distribution angle of flashed light. The flasher comprises a flash discharge tube which presents a nearly cylindrical contour; a stationary reflecting umbrella where the flash discharge tube is positioned in a bottom portion thereof and which emits light emitted from the flash discharge tube from a rectangular opening toward an object to be photographed and also reflects the light emitted from the flash discharge tube to emit the reflected light from the rectangular opening toward the object, the rectangular opening being formed at the front of the stationary reflecting umbrella and having a long edge portion positioned in parallel with a longitudinal direction of the flash discharge tube; an upper reflector plate and a lower reflector plate which present rectangular shapes, a long edge portion of the upper reflector plate being disposed near a front upper edge portion of the opening, a long edge portion of the lower reflector plate being disposed near a front lower edge portion of the opening, the upper and lower reflector plates receiving part of the light emitted from the opening and being pivoted on a shaft in parallel with a long edge of the rectangular shape in apposite directions in interlock with a change in the focal length of the photographic lens so that a direction of the reflected light emitted to the object is varied; and a frame structure which has shaft support holes for freely rotatably supporting respective rotational axes of the upper and lower reflector plates and also has a wall portion to which a bottom portion of the stationary reflecting umbrella abuts and is fixed, the flash discharge tube being positioned in the bottom portion of the stationary reflecting umbrella, the flash discharge tube and the stationary reflecting umbrella being fixed to the frame structure, and the upper and lower reflecting plates being pivotably supported by the frame structure.

The upper reflector plate and the lower reflector plate present rectangular shapes, respectively. The long edge portion of the upper reflector plate is disposed above and in front of the aforementioned opening, and the long edge portion of the lower reflector plate is disposed below and in front of the aforementioned opening. The upper and lower reflector plates receive part of the light emitted from the opening and vary the direction of the reflected light that is emitted to the object in interlock with a change in the focal length of the photographic lens. When the focal length is on a wide-angle side, the upper and lower reflector plates are driven so that they are opened in directions going away from the upper and lower edge portions of the opening of the stationary reflecting umbrella, and when the focal length lens is on a telephoto side, the upper and lower reflector plates are driven so that they are closed in directions going toward the upper and lower edge portions of the opening.

BRIEF DESCRIPTION OF THE DRAWINGS

The above and other objects and advantages will become apparent from the following detailed description when read in conjunction with the accompanying drawings wherein.

DETAILED DESCRIPTION OF THE PREFERRED EMBODIMENTS

Figure 1:
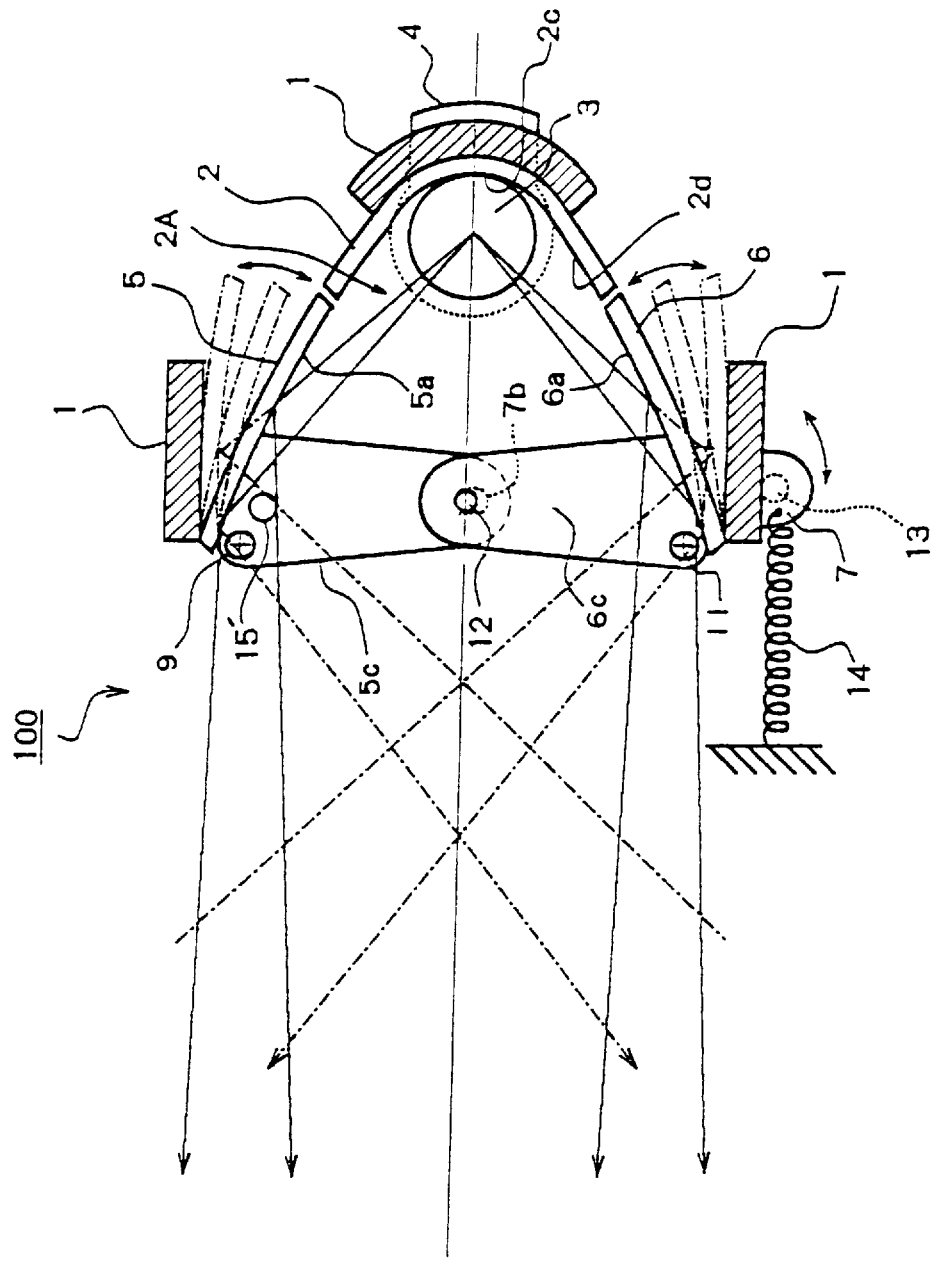
FIG. 1 is a side sectional view of a variable light distribution angle flasher according to an embodiment of the present invention.

A variable light distribution angle flasher according to a preferred embodiment of the present invention will hereinafter be described in detail with FIGS. 1 through 4.

The variable light distribution angle flasher 100 is provided with a reflecting mirror, which receives light emitted front a xenon discharge tube (flash source) 3 and irradiates the reflected light toward an object to be photographed. The reflecting mirror has a nearly parabolic surface and is constituted by a stationary reflecting mirror (stationary reflecting umbrella) 2 and a movable reflecting mirror. The stationary reflecting mirror 2 and the xenon discharge tube 3 are accommodated and fixed to the interior of a frame structure 1 by using a fixing band 4. The xenon discharge tube 3 is nearly cylindrical in shape.

Figure 2:
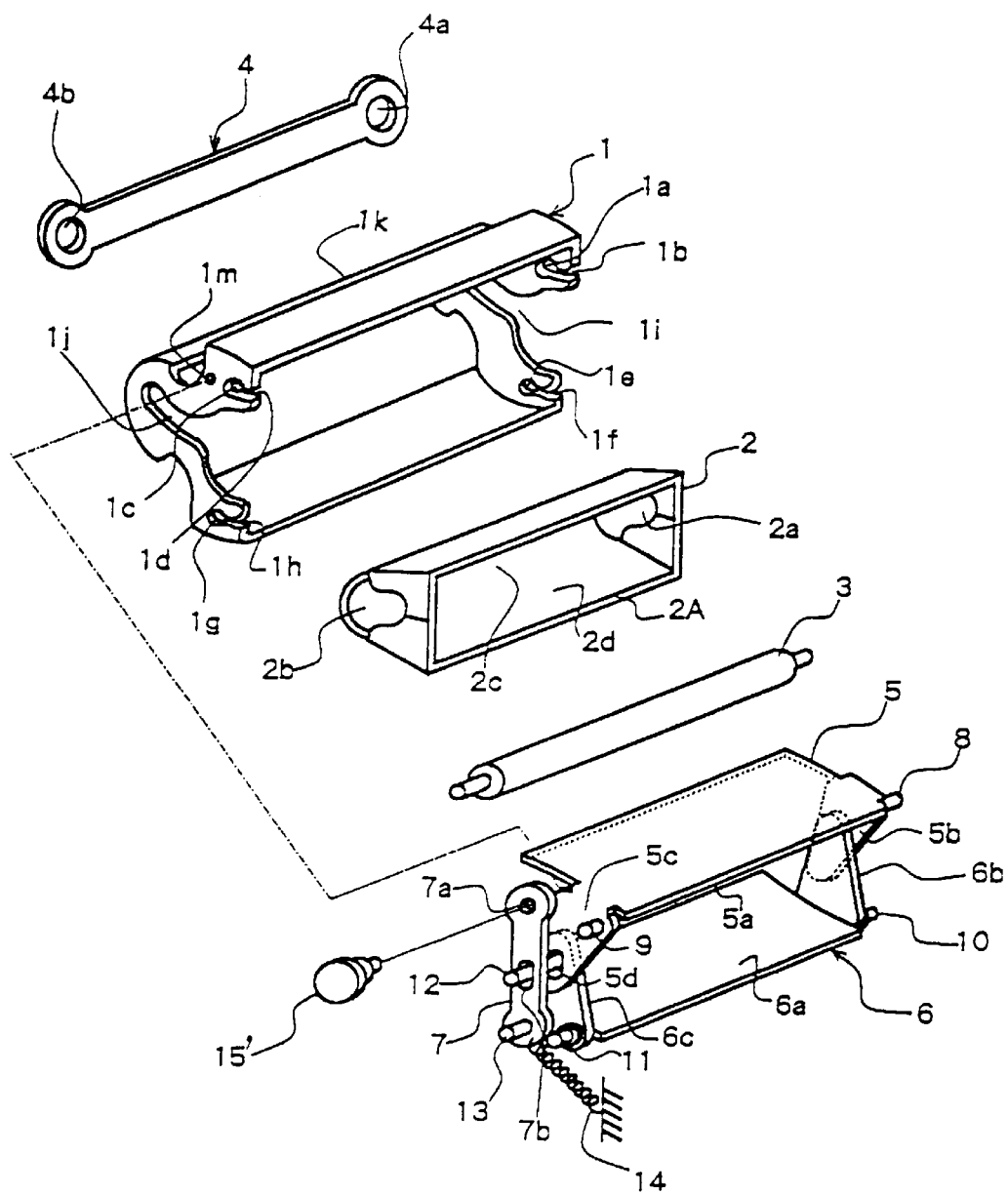
FIG. 2 is an exploded perspective view of the variable light distribution angle flasher shown in FIG. 1.

The movable reflecting mirror is constituted by an upper reflector plate 5 and a lower reflector plate 6. The upper reflector plate 5 is provided above and in front of the stationary reflecting mirror 2, while the lower reflector plate 6 is provided below and in front of the stationary reflecting mirror 2. A shaft supporting hole 1m, as shown in FIG. 2, is punched in the side portion of the frame structure 1, and a stepped pin 15' is inserted and fixed to this shaft supporting hole 1m. By the stepped pin 15' a drive lever 7 is attached to the frame structure 1. The upper reflector plate 5 and the lower reflector plate 6 are pivotably driven by the drive lever 7.

The frame structure 1 is formed integrally from synthetic resin. As shown in FIG. 2, the frame structure 1 has at the front thereof an opening which is substantially rectangular in shape. The frame structure 1 further has four engagement holes 1a, 1c, 1e, and 1g at the opposite end portions thereof. These engagement holes 1a, 1c, 1e, and 1g penetrate through the opposite end portions in the longitudinal direction of the frame structure 1.

At the opposite side portions, guide grooves 1b, 1d, 1f, and 1h extend forward from the engagement holes 1a, 1c, 1e, and 1g, respectively. Each groove is slightly narrower than the diameter of the corresponding engagement hole at the paint where the groove and the engagement hole meet each other. Then, the groove width of each groove becomes narrow as it goes forward (to the opening).

Support shafts 8 through 11 are received in the engagement holes 1a, 1c, 1e, and 1g formed in the opposite side portions, respectively. The aforementioned upper reflector plate 6 is supported so that it can pivot on the upper support shafts 8 and 9. Similarly, the lower reflector plate 6 is supported so that it can pivot on the lower support shafts 10 and 11. The support shafts 8 through 11 are guided into the engagement holes 1a, 1c, 1e, and 1g through the guide grooves 1b, 1d, 1f, and 1h, respectively. The support shafts 8 through 11 are forced into the grooves 1b, 1d, 1f, and 1h against the elastic force of the material forming the frame structure 1, thereby supporting the support shafts by the engagement holes. Each of the guide grooves 1b, 1d, 1f, and 1h fulfills an important role in preventing each of the support shafts 8 through 11 from slipping out after the support shafts have been supported by the engagement holes 1a, 1c, 1e, and 1g.

Cutouts 1and 1j are formed in both side portions of the frame structure 1. The width of each of the cutouts 1i and 1j becomes narrower from the longitudinal intermediate portion between the front and rear portions of the cutout toward the rear portion. At the back of the frame structure 1a wall surface 1k is formed. On the wall surface 1k the outer wall of the depth portion (bottom portion) of the stationary reflecting mirror 2 abuts and is fixed. The xenon discharge tube 3 is also positioned in the depth portion of the stationary reflecting mirror 2.

The stationary reflecting mirror 2 has a reflecting surface positioned in the upper and lower portions and the depth portion, both side surfaces positioned in both sides, and an opening 2A positioned at the front. The reflecting surface has a shape which varies, for example, at the front portion (the side of the opening 2A) and the rear portion. On the front portion a reflecting surface 2d with a parabolic section is formed. On the rear portion a reflecting surface 2c with a circular arc section is formed. The circular arc reflecting surface 2c matches with the contour of the xenon discharge tube 3. The parabolic reflecting surface 2d and the circular arc reflecting surface 2c are provided so that they are continuous to each other.

The opening 2A presents a rectangular shape. The long edge portion of the opening 2A is in parallel with the longitudinal direction of the xenon discharge tube 3. As shown in FIG. 2, the stationary reflecting mirror 2 has openings 2a and 2b near the depth portions of the opposite side surfaces thereof. The xenon discharge tube 3 can be inserted through the openings 2a and 2b. When the xenon discharge tube 3 is inserted through the openings 2a and 2b, the opposite ends of the xenon discharge tube 3 protrude from the openings 2a and 2b. On one end side of the protruded xenon discharge tube 3 a discharge electrode and a trigger electrode (not shown) are positioned, and on the other end side a discharge electrode is positioned.

Holes 4a and 4b which are nearly equal to the diameter of the xenon discharge tube 3 are punched in the opposite ends of the fixing band 4. The opposite ends of the xenon discharge tube 3 are inserted through the openings 2a and 2b of the stationary reflecting mirror 2 and protrude from the cutouts 1i and 1j. On the protruded opposite ends of the xenon discharge tube 3, the fixing band 4 is attached from the back side of the frame structure 1 through the openings 4a and 4b of the fixing band 4. The fixing band 4 presents a strip shape and is constituted by material (e.g. silicon rubber) which can stand heat generated by the xenon discharge tube 3. In this way, the wall surface 1k of the frame structure 1, the depth portion of the stationary reflecting mirror 2, and the outer peripheral surface of the xenon discharge tube 3 are closely fixed to one another.

Each of the upper and lower reflector plates 5 and 6 is presented as nearly rectangular in shape. The sectional profile, of each of the upper and lower reflector plates 5 and 6 is formed into a shape that extends a parabolic surface. The inner surfaces of the upper and lower reflector plates 5 and 6 have parabolic reflecting surfaces 5a and 6a. The upper reflector plate 5 is disposed above and in front of the opening 2A, whereas the lower reflector plate 6 is disposed below and in front of the opening 2A.

The opposite ends of the upper reflector plate 5 are bent in a right-angle direction to form bent portions 5b and 5c. Likewise, the opposite ends of the lower reflector plate 6 are bent in a right-angle direction to form bent portions 6b and 6c. From the bent portions 5b, 5c, 6b, and 6c the aforementioned support shafts 8 through 11 protrude. These support shafts 8 through 11 are provided on the sides of the upper and lower reflector plates 5 and 6 which are far away from the opening 2A of the stationary reflecting mirror 2.

In the bent portion 5c of the upper reflector plate 5 an elongated engagement hole 5d is punched. Also, in the bent portion 6c of the lower reflector plate 6 a drive pin 12 is mounted. The lower end portion of the drive pin 12 engages (or is fitted into) the elongated engagement hole 5d. On the other hand, the upper end portion of the drive pin 12 engages an elongated hole 7b formed in the intermediate portion of the drive lever 7, A support shaft 13 is fixed to the lower end portion of the drive lever 7. Between the lower end of the drive lever 7 near the support shaft 13 and a fixed portion, there is provided a tension spring 14. By the tension spring 14, the drive lever 7 is urged in a clockwise direction of FIG. 1 with the stepped pin 15' as a center of rotation, The support shaft 13 engages an interlocking member that is driven in interlock with the variable-focus mechanism (or the field angle of coverage varying mechanism) of a photographic lens (not shown).

In the variable light distribution angle flasher, the upper reflector plate 5 and the lower reflector plate 6 are pivoted on the support shafts 8 through 11 in interlock with a change in the focal length (or the field angle of coverage) of the photographic lens.

It the photographic lens is driven to the telephoto side, the support shaft 13 will be pulled by the interlocking member. The drive lever 7 is pivoted on the stepped pin 15' in the clockwise direction of FIG. 1. When the interlocking member is in the most telephoto state, the drive lever 7 is positioned at the outermost end in the clockwise direction.

At this time, the drive pin 12 is in its stopped state where it abuts the upper wall face of the elongated hole 7b of the drive lever 7. Also, by the engagement of the drive pin 12 with the elongated engagement hole 5d, the upper and lower reflector plates 5 and 6 are in the most closed state. In the closed state the end portions of the upper and lower reflector plates 5 and 6 which are near the opening 2A are moved toward each other. At the same time, the reflecting surface of the upper reflector plate 5 and the reflecting surface of the lower reflector plate 6 are disposed so that the reflecting surfaces are nearly continuous to parabolic reflecting surfaces extended from the parabolic reflecting surfaces of the stationary reflecting mirror 2 toward the opening 2A, (see solid lines of FIG. 1).

If, on the other hand, the photographic lens is driven to the wide-angle side, the support shaft 13 will be pushed by the interlocking member. The drive lever 7 is pivoted on the stepped pin 15' in the counterclockwise direction of FIG. 1. If the drive lever 7 is pivoted in the counterclockwise directions, the end portions of the upper and lower reflector plates 5 and 6 which are near the opening 2A will be moved away from each other by the engagement of the drive pin 12 with the elongated engagement hole 5d (see dashed lines of FIG. 1).

The center axis of the xenon discharge tube 3 is positioned near the focal position of the parabolic reflecting surface 2d. If the xenon discharge tube 3 emits light, the emitted light will be irradiated forward, that is, from the opening 2A directly toward an object to be photographed. At the same time, the emitted light from the xenon discharge tube 3 is reflected by both the circular arc reflecting surface 2c and the parabolic reflecting surface 2d, and the reflected light is irradiated from the opening 2A toward the object to be photographed. In addition, part of the light irradiated from the opening 2A is reflected by the parabolic reflecting surfaces 5a and 6a.

Thus, the direction of reflection of the light which is reflected by the upper and lower reflector plates 5 and 6 can be changed according to the pivotal motion of the upper and lower reflector plates 5 and 6. When a telephoto lens is used, flashed light is irradiated at a small light distribution angle in interlock with a narrow field angle of coverage. When, on the other hand, a wide-angle lens is used, flashed light is irradiated at a large light distribution angle in interlock with a wide field angle of coverage.

Figure 3:
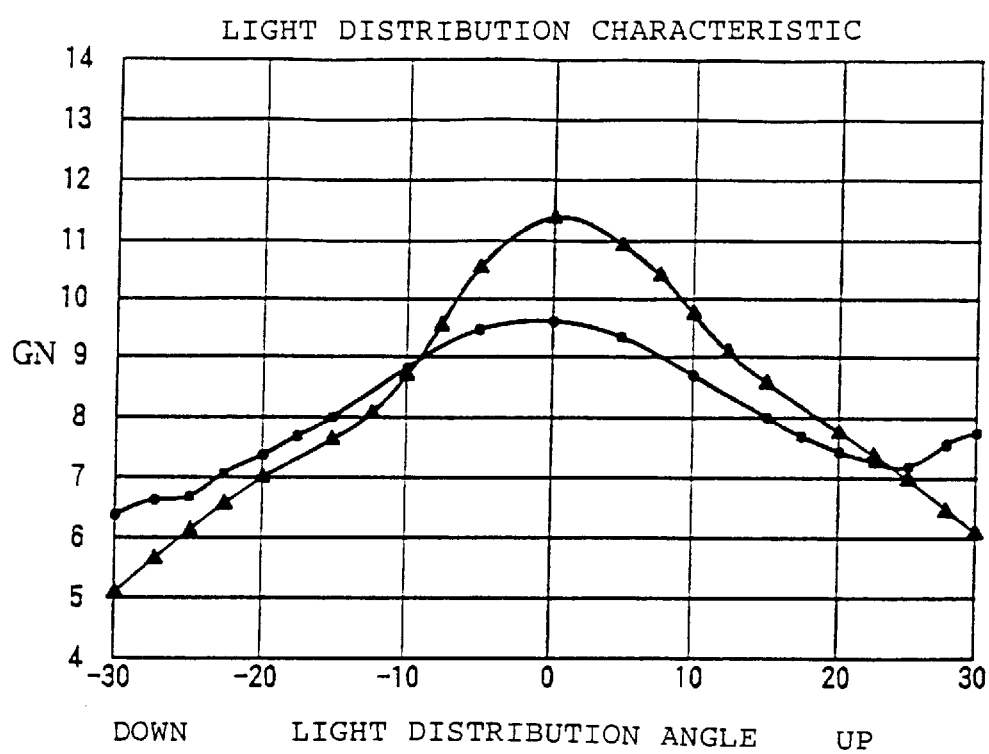
FIG. 3 is a light distribution characteristic diagram of the variable light distribution angle flasher shown in FIGS. 1 and 2.

FIG. 3 shows the light distribution characteristic (the relation of a guide number GN to a light distribution angle) of the aforementioned flasher. Here a xenon discharge tube of diameter 2 mm and arc length 14 mm and a 180 $\mu$F capacitor are employed. The depth from the opening 2A of the stationary reflecting mirror 2 to the depth portion of the circular arc reflecting mirror 2c is 2.5 mm. ●—● shows when a wide-angle lens is used, and ▲—▲ shows when a telephoto lens is used. As evident in FIG. 3, the maximum guide number GN which is 9.7 when the wide-angle lens is used is increased to 11.3 when the telephoto lens is used. Also, in a wider range than ±20°, the guide number GN when the wide-angle lens is used becomes greater than the guide number GN when the telephoto lens is used. From these facts it follows that the flashed light is effectively used when the telephoto lens is used and when the wide-angle lens is used.

Figure 4:
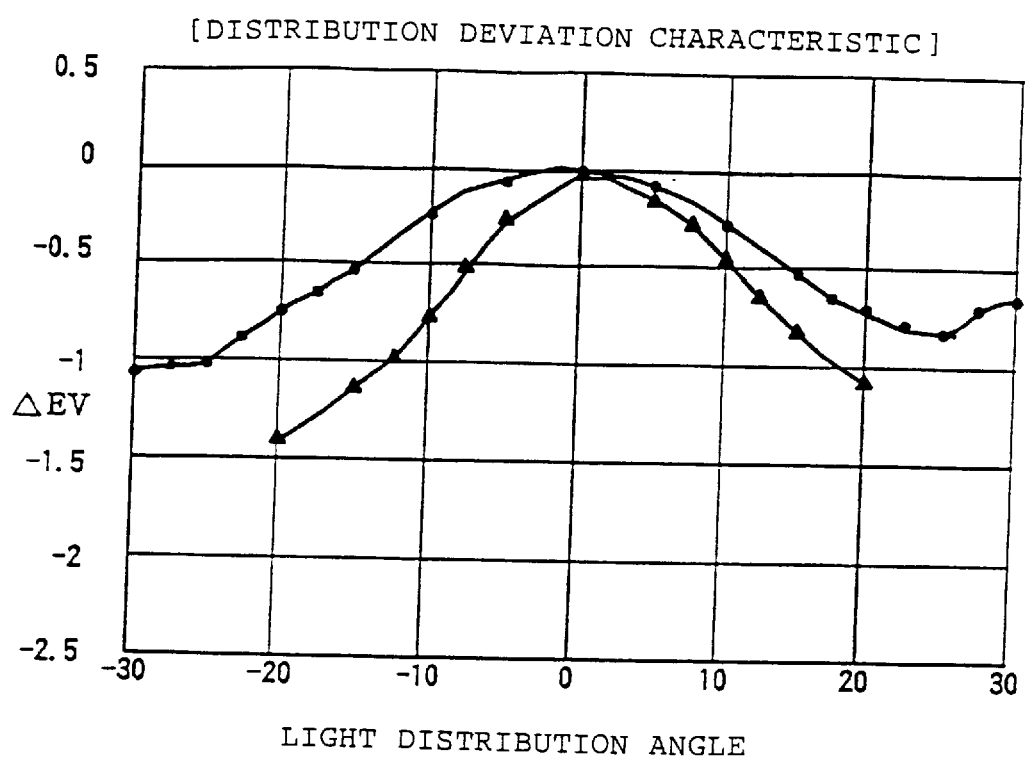
FIG. 4 is a characteristic diagram showing the deviation characteristic of light distributed by the variable light distribution angle flasher shown in FIGS. 1 and 2.

In FIG. 4 there is shown the relation between a deviation $\Delta$EV and a light distribution angle when the center of the light distribution angle is taken to be OEV. ●—● a shows when the wide-angle lens is used, and ▲—▲ shows when the telephoto lens is used. When the wide-angle lens is used, the focal length of the camera is 35 mm and the field angle of coverage is ±30°. When, on the other hand, the telephoto lens is used, the focal length of the camera is 70 mm and the field angle of coverage is ±10°. From FIG. 4 it is found that, when the wide-angle lens is used, the maximum deviation $\Delta$EV is about −1 EV and when the telephoto lens is used, the maximum deviation $\Delta$EV is about −0.7 EV. In either case the deviation is absorbed in the film latitude. From this fact it is found that, in a necessary range of a field angle of coverage, the flashed light is spread approximately on an average. Therefore, it follows that the variable light distribution angle flasher of the present invention has an excellent light distribution characteristic both when the telephoto lens is used and when the wide-angle lens is used.

The present invention is not limited to an example of the variable light distribution angle flasher of the aforementioned embodiment, but various modifications are possible without departing from the scope of the present invention.

Figure 5:
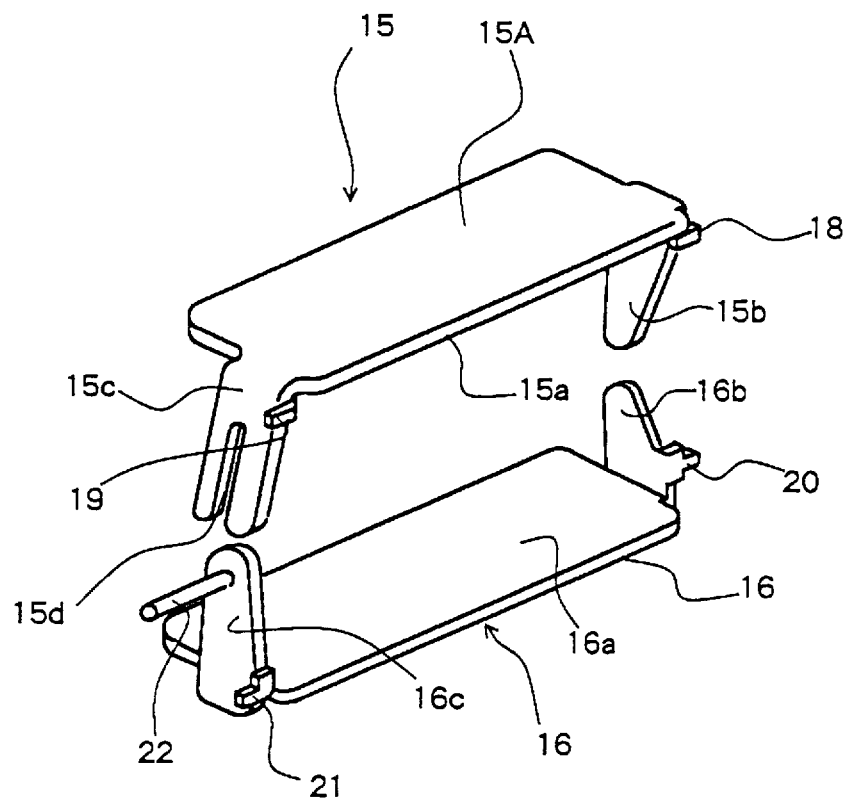
FIG. 5 is an exploded perspective view of the upper and lower reflector plates of a variable light distribution angle flasher according to another embodiment of the present invention.

For instance, an upper reflector plate 15 and a lower reflector plate 16, shown in FIG. 5, may be employed instead of the upper reflector plate 5 and the lower reflector plate 6. The opposite end portions of the upper reflector plate 15 are formed integrally with bent portions 15b and 5c. In the same way, the opposite end portions of the lower reflector plate 16 are formed integrally with bent portions 16b and 16c. Also, support shafts 18 through 21 are formed integrally in the bent portions 5b. 5c 16b, and 16c. The support shafts 18 through 21 are operated in the same way as the support shafts 8 through 11 of the aforementioned embodiment. Thus, when the shaft support members and the reflecting mirror are integrally formed with each other, the cost can be further reduced because the number of parts is reduced.

In addition, the elongated engagement hole 5d in FIG. 2 may be formed into an elongated groove 15d, as shown in FIG. 5. In this way, the assembling operation between the elongated groove 15d and the elongated hole 7b of the drive lever 7 becomes easy, so the cost is likewise reduced.

Furthermore, the tension spring 14 needs to be set so that a rotational urging force is applied to the drive lever 7 in the opposite direction, depending upon an interlocking member connected to the drive lever 7. In this case the rotational urging force may be applied by a torsion spring instead of the tension spring 14.

The shape of the reflecting surface of each of the upper and lower reflector plates is not limited to a parabolic surface but may be an elliptic surface, a flat surface, or a circular arc surface. Similarly, the shape of the reflecting surface of the stationary reflecting mirror is not limited to a parabolic surface but may be an elliptic surface, a flat surface, or a circular arc surface.

Moreover, if the movable reflecting mirror is driven in interlock with the focal length (or field angle of coverage) of the photographic lens of the camera, the distribution angle of the flashed light will be interlocked. Therefore, the present invention is also applicable to an automatic zoom flash.

In accordance with the present invention, as clearly described above, the upper and lower reflector plates are pivoted in interlock with a change in the focal length (or field angle of coverage) of the photographic lens. With the pivotal motion, the direction of the reflected light from the upper and lower reflector plates is varied. As a result, the light distribution angle has been controlled. Furthermore, the pivotal mechanism is mechanically simple. Therefore, there is provided a variable light distribution angle flasher where the distribution angle of the flashed light can be effectively varied with simple structure and less expense without using high-performance lenses or an accurate moving mechanism and without emitting wasteful light when a telephoto lens is used as well as when a wide-angle lens is used. Moreover, the variable light distribution angle flasher is used in a camera equipped with a varifocal photographic lens and can change the light distribution angle in interlock with a change in the focal length or field angle of coverage of the photographic lens.

What is claimed is:

1. A flasher comprising:

a reflecting assemblage which receives light emitted from a flash source and irradiates reflected light toward an object to be photographed wherein a distribution angle of the light that is irradiated toward said object is variable, said reflecting assemblage comprising a stationary reflecting mirror where a distribution angle of the light reflected toward said object is constant, said stationary reflecting mirror having an upper portion, lower portion and depth portion with a reflecting surface positioned in the upper portion, lower portion and depth portion, a movable reflecting mirror having an upper reflector plate disposed above said stationary mirror and a separate lower reflector plate disposed below said stationary mirror, each of said upper and lower reflector plates being separate from the stationary reflecting mirror, wherein said upper and lower reflector plates are interlocked and configured to rotate about an axis of said stationary mirror, where a distribution angle of the light reflected toward said object is variable, and a drive mechanism for driving said movable reflecting mirror.

2. A flasher for use in a camera with a variable field angle of coverage, comprising:

a reflecting assemblage for receiving light emitted from a flash source and irradiating reflected light toward an object to be photographed wherein a distribution angle of the light that is irradiated toward said object is varied with a change in said field angle of coverage, said reflecting assemblage comprising a stationary reflecting mirror where a distribution angle of the light reflected toward said object is constant, said stationary reflecting mirror having an upper portion, lower portion and depth portion with a reflecting surface positioned in the upper portion, lower portion and depth portion, a movable reflecting mirror having an upper reflector plate disposed above said stationary mirror and a separate lower reflector plate disposed below said stationary mirror, each of said upper and lower reflector plates being separate from the stationary reflecting mirror, wherein the upper and lower reflector plates are interlocked and configured to rotate about an axis of said stationary mirror, where a distribution angle of the light reflected toward said object is variable, and a drive mechanism for driving said movable reflecting mirror in interlock with a change in said field angle of coverage.

3. A flasher for use in a camera with varifocal photographic lenses comprising:

a reflecting assemblage for receiving light emitted from a flash source and irradiating reflected light toward an object to be photographed wherein a distribution angle of the light that is irradiated toward said object is varied with a change in focal length of said varifocal photographic lens, said reflecting assemblage comprising a stationary reflecting mirror where a distribution angle of the light reflected toward said object is constant, said stationary reflecting mirror having an upper portion, lower portion and depth portion with a reflecting surface positioned in the upper portion, lower portion and depth portion, a movable reflecting mirror having an upper reflector plate disposed above said stationary mirror and a separate lower reflector plate disposed below said stationary mirror, each of said upper and lower reflector plates being separate from the stationary reflecting mirror, wherein said upper and lower reflector plates are interlocked and configured to rotate about an axis of said stationary mirror, where a distribution angle of the light reflected toward said object is variable, and a drive mechanism for driving said movable reflecting mirror in interlock with a change in said focal length.

4. The flasher as set forth in claim 3, wherein said flash source is a cylindrically shaped flash discharge tube;

said stationary reflecting mirror is constructed so as to receive light emitted from said flash discharge tube and irradiate reflected light from an opening formed forwards toward said object to be photographed; and the upper reflector plate being disposed in front of said opening, the lower reflector plate being disposed in front of said opening, and the upper and lower reflector plates receiving part of the light emitted from said opening and being titled up and down in interlock with a change in the focal length of said varifocal photographic lens so that a distribution angle of the reflected light emitted to said object is varied.

5. The flasher as set forth in claim 4, wherein said movable reflecting mirror is driven continuously or by steps in interlock with a change in said focal length.

6. The flasher as set forth in claim 4, wherein portions of said upper reflector plate and said lower reflector plate which are far away from said opening are supported, and when said focal length is on a wide-angle side, portions of said upper and lower reflector plates which are near said opening are driven so as to be moved away from each other, and when said focal length is on a telephoto side, said portions of said upper and lower reflector plates which are near said opening are driven so as to be moved toward each other.

7. The flasher as set forth in claim 6, wherein a reflecting surface of each of said upper reflector plate, said lower reflector plate, and said stationary reflecting mirror has a parabolic shape.

8. The flasher as set forth in claim 7, wherein, when said focal length is on the telephoto side, the reflecting surface of the upper reflector plate and the reflecting surface of the lower reflector plate are disposed so that the reflecting surfaces are substantially continuous to parabolic reflecting surfaces extended from a parabolic reflecting surface of the stationary reflecting mirror toward said opening.

9. A flasher for use in a camera with varifocal photographic lenses having a variable distribution angle of flashed light, the flasher comprising:

a flash discharge tube which has a cylindrical contour;

a stationary reflecting umbrella for reflecting light emitted from said flash discharge tube and emitting the reflected light from an opening formed forwards toward an object to be photographed, said stationary reflecting umbrella having an upper portion, lower portion and depth portion with a reflecting surface positioned in the upper portion, lower portion and depth portion; and an upper reflector plate and a separate lower reflector plate, both the upper and lower reflector plates being separate from the stationary reflecting umbrella with the upper reflector plate being disposed above and in front of said opening, and the lower reflector plate being disposed below and in front of said opening, the upper and lower reflector plates receiving part of the light emitted from said opening and being interlocked and rotatable about an axis of the stationary reflecting umbrella with a change in focal length of said photographic lens so that a distribution angle of the reflected light emitted to said object is varied.

10. The flasher as set forth in claim 9, wherein, when the focal length of the photographic lens is on a wide-angle side, said upper and lower reflector plates are driven so that they are opened in directions going away from upper and lower edge portions of the opening of the stationary reflecting umbrella, and when said focal length of the photographic lens is on a telephoto side, said upper and lower reflector plates are driven so that they are closed in directions going toward the upper and lower edge portions of the opening of said stationary reflecting umbrella, and a distribution angle of the flashed light that is emitted toward said object can be varied continuously or by steps by said stationary reflecting umbrella, said upper reflector plate, and said lower reflector plate.

11. The flasher as set forth in claim 9, wherein the upper reflector plate and the lower reflector plate are pivotably supported by shaft support members so that quantities of movement of the upper reflector plate and the lower reflector plate, based on a change in the focal length of the photographic lens, become greater at a side of the opening of the stationary reflecting umbrella than at a side near the object to be photographed.

12. The flasher as set forth in claim 9, wherein the upper reflector plate and the lower reflector plate are constructed so that, when they draw nearest to the opening of said stationary reflecting umbrella, the respective reflecting surfaces are continuously connected to a reflecting surface positioned at the opening of said stationary reflecting umbrella.

13. The flasher as set forth in claim 9, wherein the shaft support members which are supported in parallel with respective long edge portions of the upper and lower reflector plates are formed integrally with bent portions formed in respective end portions of said upper and lower reflector plates.

14. A flasher for use in a camera with varifocal photographic lenses having a variable distribution angle of flashed light, the flasher comprising:

a flash discharge tube which has a cylindrical contour;

a stationary reflecting umbrella having an upper portion, lower portion and depth portion with a reflecting surface positioned in the upper portion, lower portion and depth portion, wherein said flash discharge tube is positioned in said depth portion thereof and which emits light emitted from said flash discharge tube from a rectangular opening toward an object to be photographed and also reflects the light emitted from said flash discharge tube to emit the reflected light from said rectangular opening toward said object, the rectangular opening being formed at a front of said stationary reflecting umbrella and having a long edge portion positioned in parallel with a longitudinal direction of said flash discharge tube;

an upper reflector plate and a separate lower reflector plate each of which is separate from the stationary reflecting umbrella and has a rectangular shape, a long edge portion of the upper reflector plate being disposed near a front upper edge portion of said opening, a long edge portion of the lower reflector plate being disposed near a front lower edge portion of said opening, the upper and lower reflector plates receiving part of the light emitted from said opening and being pivoted on a shaft in parallel with a long edge of said rectangular shape in opposite directions in interlock with a change in focal length of said photographic lens so that a direction of the reflected light emitted to said object is varied; and a frame structure which has shaft support holes for rotatably supporting respective rotational axes of said upper and lower reflector plates and also has a wall portion to which a bottom portion of the stationary reflecting umbrella abuts and is fixed, said flash discharge tube and said stationary reflecting umbrella being fixed to said frame structure, and said upper and lower reflecting plates being pivotably supported by said frame structure.

\* \* \* \* \*